Nov. 22, 1966 J. H. MORRISON 3,287,508

SOUND REPRODUCING DEVICE HAVING A REPLACEABLE ENDLESS TAPE CARTRIDGE

Filed Nov. 1, 1961 2 Sheets-Sheet 1

INVENTOR.
JIMMIE H. MORRISON

BY

Dunlap, Laney & Hubbard
ATTORNEYS

Nov. 22, 1966 J. H. MORRISON 3,287,508

SOUND REPRODUCING DEVICE HAVING A REPLACEABLE ENDLESS TAPE CARTRIDGE

Filed Nov. 1, 1961 2 Sheets-Sheet 2

INVENTOR.
JIMMIE H. MORRISON

BY

Dunlap, Laney, Hubbard

ATTORNEYS 3,287,508
Patented Nov. 22, 1966

3,287,508

SOUND REPRODUCING DEVICE HAVING A REPLACEABLE ENDLESS TAPE CARTRIDGE

Jimmie H. Morrison, 770 Iowa St., Norman, Okla.

Filed Nov. 1, 1961, Ser. No. 149,417
12 Claims. (Cl. 179—100.2)

The present invention relates to devices for recording and reproducing sound, and more particularly, but not by way of limitation, relates to a sound recording and/or playback device having an improved, readily removable and replaceable endless magnetic tape cartridge.

As is well-known in the sound recording and reproducing art, it has become increasingly popular in the advertising, sales and public relations fields to employ a recorded message pointing out the features and describing the operation of a particular product or service by means of a record device located close by the item or visual display being sold or described. Usually the device is started merely by pressing a button and is automatically stopped when the message has been completed. The record devices for this purpose have, in many cases, utilized an endless tape upon which the message is recorded so that when the tape has played the message through one time, it is then back at the original starting point and is ready to repeat the message without being rewound.

It is also known in the art to house the endless tape in a replaceable cartridge which can be placed in operative position on a playback device and in some cases this can be done without the inconvenience of threading the tape. Most of these cartridges contain a rotatable reel upon which the endless tape is stored in such a manner that the tape is removed from the inside of the reel by taking the innermost coil of the tape and is returned, after passing a magnetic flux pickup head, as the outermost coil on the reel. In addition to the reel-type cartridges, various arrangements of rollers, guide channels and housing have been devised to cause the endless tape to form in a coil, with the tape being removed from the inside of the coil, passed over a pickup head, and returned to the ouside of the coil. In most cases, the cartridges have a number of moving parts and require relatively precision manufacture and laborious assembly, which contribute to a high cost.

The present invention contemplates a replaceable cartridge having several novel features and combinations of features, and a sound recording and/or reproducing device having a novel arrangement of operative parts to be used in combination with the cartridge. The several novel features and combinations are illustrated in the device herein described in detail which in general comprises an appropriate electronic circuit which is contained within a circuit housing having a generally flat face. A replaceable tape cartridge has an outer wall which abuts the face of the circuit housing. A novel tape coiling guide is contained within the cartridge and has an open center portion and a slot in one side thereof for passing the tape into the open center portion. The tape coiling guide is so disposed within the housing as to cause an endless tape to coil in a plane generally parallel to the wall of the cartridge which abuts the flat face of the circuit housing. A first aperture in the first wall of the cartridge is disposed adjacent the open center portion of the tape coiling guide means, and a pickup head projects from the circuit housing through the first aperture and into the open center portion of the coiling guide. An idler wheel is journaled in the cartridge at a point generally in line with the slot and the first aperture in the cartridge, and therefore in line with the pickup head projecting through the aperture, with the pickup head in the middle. An endless tape is coiled around the tape coiling guide. The innermost coil of the endless tape passes through the slot in the guide means; passes across the pickup head; is twisted 90° relative to the slot and passes across the opposite side of the tape coiling guide; passes around the idler wheel, and then returns as the outermost coil of the endless tape coiled around the tape coiling guide. A second aperture is provided in the wall of the cartridge adjacent the idler wheel, and a novel drive capstan projects from the face of the circuit housing through the aperture and frictionally engages the tape as it passes around the idler wheel. Novel means are also provided for releasably holding the cartridge in properly aligned and abutting position against the flat face of the circuit housing and in a position so that the tape passing around the idler wheel firmly presses against the drive capstan. Therefore, when the drive capstan is rotated by a motor within the circuit housing, the friction between the drive capstan and the tape will pull the endless tape from the innermost coil disposed around the tape coiling guide means through the slot, over the pickup head and over the opposite side of the coil of tape and the guide means and around the idler wheel. The tape will be returned as the outermost coil of the endless tape coiled around the guide means.

It is an important object of the present invention to provide a compact, economically constructed sound recording and reproducing device utilizing an improved endless magnetic tape cartridge which can be easily and quickly removed and replaced without threading the tape.

Another object of the present invention is to provide a replaceable endless tape cartridge which is exceedingly thin and compact by reason of a novel tape coiling guide design and arrangement of other operative parts.

Another important object of the present invention is to provide a replaceable endless tape cartridge for the device described which can be economically and easily mass-produced.

Another important object of the present invention is to provide a sound recording and reproduction device having a replaceable endless tape cartridge in which the replaceable cartridge is biased into operative position and locked to the device by a very simple and easily operated mechanism so that the tape cartridge can be removed and replaced in one simple motion.

Another object of the present invention is to provide a sound recording and reproducing device of the type described which has a novel tape drive mechanism which is easily and simply engaged and which will provide improved performance so as to permit a more compact cartridge.

Another object of the present invention is to provide a sound recording and reproduction device of the type described which will automatically stop operation of the device after the endless tape has been played one time.

Additional novel features, objects and advantages will be readily evident from the following detailed description and drawings, wherein.

Figure 1:
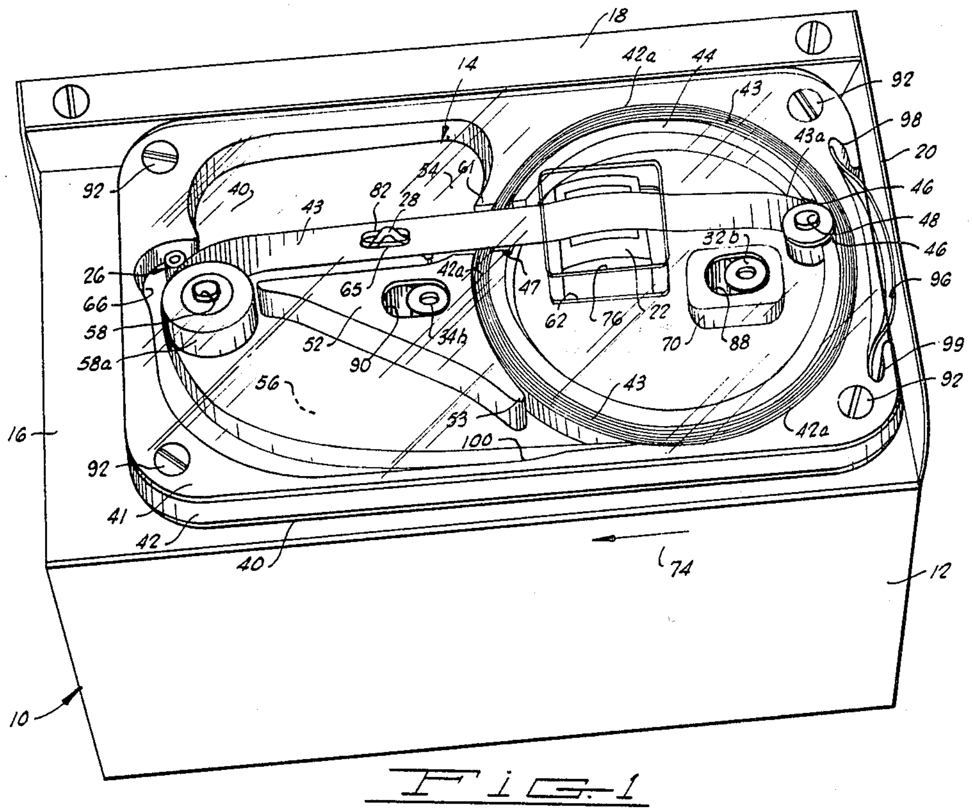
FIGURE 1 is a perspective view of a magnetic tape recording and/or reproducing device in combination with a replaceable tape cartridge fabricated primarily of clear plastic, the combination being constructed in accordance with the present invention.

Referring now to the drawings in detail, and in particular to FIG. 1, a sound recording and reproducing device is indicated generally by the reference numeral 10. The device 10 is comprised generally of the combination of two separable parts, a circuit housing 12 and a magnetic tape cartridge 14. The circuit housing 12 is of any suitable compact construction, being as small as possible and yet house the necessary circuitry and electromechanical parts required to record and/or reproduce sound. It is to be understood that this invention is not restricted to sound recording and reproduction devices, but is intended to include any type of a device for recording and/or reproducing electrical signals by means of an endless magnetic or similar tape. Therefore, the circuitry within the housing 12 may include only those components necessary to record sound or only those components necessary to reproduce sound already recorded, or a combination of both components, as will usually be the case. Therefore, the housing 12 will normally be sufficiently large to contain a loudspeaker, batteries, and a drive motor to drive the magnetic tape, in addition to the necessary electronic circuitry.

The circuit housing 12 has a generally flat face 16 (see FIG. 2) with a guide portion 18 along one side and an end plate 20 projecting upwardly along one end. A record playback pickup head 22, an automatic cutoff switch 24, and a drive capstan 26 project from the face 16 and are generally aligned along a line parallel to the guide 18 and perpendicular to the end plate 20. The pickup head 22 may be of any conventional type having a surface 27 across which the magnetic tape bearing the recorded magnetic flux is passed.

Figure 2:
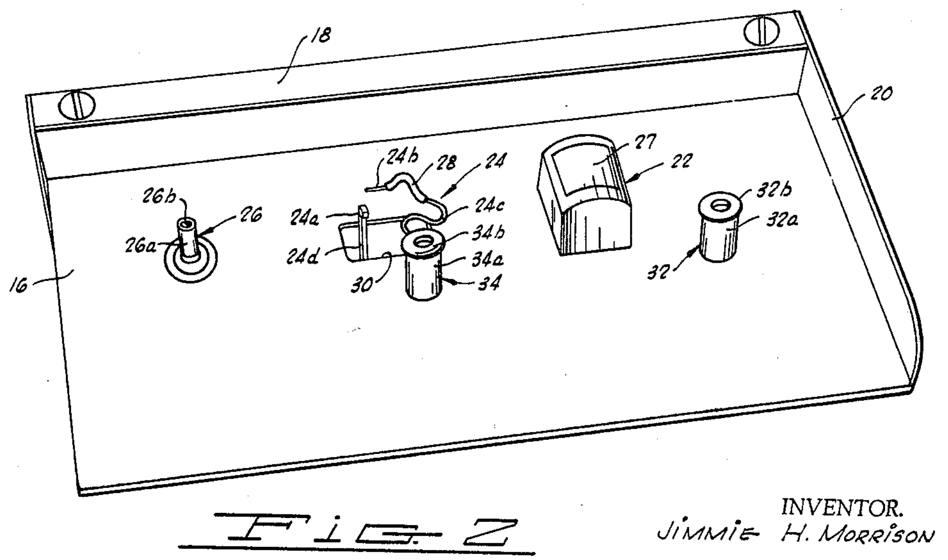
FIGURE 2 is a perspective view from substantially the same viewpoint as that of FIG. 1, with the replaceable cartridge removed to show the face of the circuit housing with the novel arrangement of operative parts projecting therefrom, as hereafter described.

The automatic cutoff switch 24 is preferably comprised of first and second contacts **24*a* and 24*b*. The contact 24*b* is merely the end of an arm-like spring wire electrical conductor 24*c* having a curvature substantially as shown in FIG. 2. The spring wire is normally biased so that the contacts 24*a* and 24*b* are open, as shown in FIG. 2. The uppermost curved portion of the spring wire conductor 24*c* is preferably protected from abrasion by a hard plating or sleeve 28 to prevent excessive wear due to rubbing contact with the magnetic tape, as hereafter described. The switch contacts 24*a* and 24*b* are connected in parallel with a manual start switch (not shown) so that when either of the switches is closed the device will operate; and, when both switches are open, the operation of the device will be stopped. The switch 24 extends from the interior of the circuit housing 12 and projects through an opening 30 in the face 16.**

The drive capstan 26 projects from the face 16 at generally a right angle and comprises a resilient silicon rubber friction sleeve **26*a* telescoped over the drive shaft 26*b* of an electric drive motor (not shown) contained within the circuit housing 12.**

A pair of fastener studs 32 and 34 are aligned generally parallel to the imaginary line passing from the end plate 20 through the pickup head 22, the switch 24 and the drive capstan 26. The fastener studs 32 and 34 have shank portions **32*a* and 34*a*, respectively, and enlarged head portions 32*b* and 34*b*,** respectively, for purposes hereafter described.

The magnetic tape cartridge 14 is comprised of a pair of spaced flat plates 40 and 41 (see FIG. 1) which are joined together by a peripheral side wall 42 of slightly greater height than the width of an endless tape 43 which is contained within the cartridge. Preferably, the plates 40 and 41 and side wall 42 are fabricated of transparent plastic, as in the embodiment illustrated, so that the position of the tape 43 and operation of the device can be easily observed at all times. The endless tape 43 is preferably fabricated of a special permanently lubricated plastic material which has a very low coefficient of friction.

This type tape is well known in the art and was especially developed for endless tapes.

Figure 4:
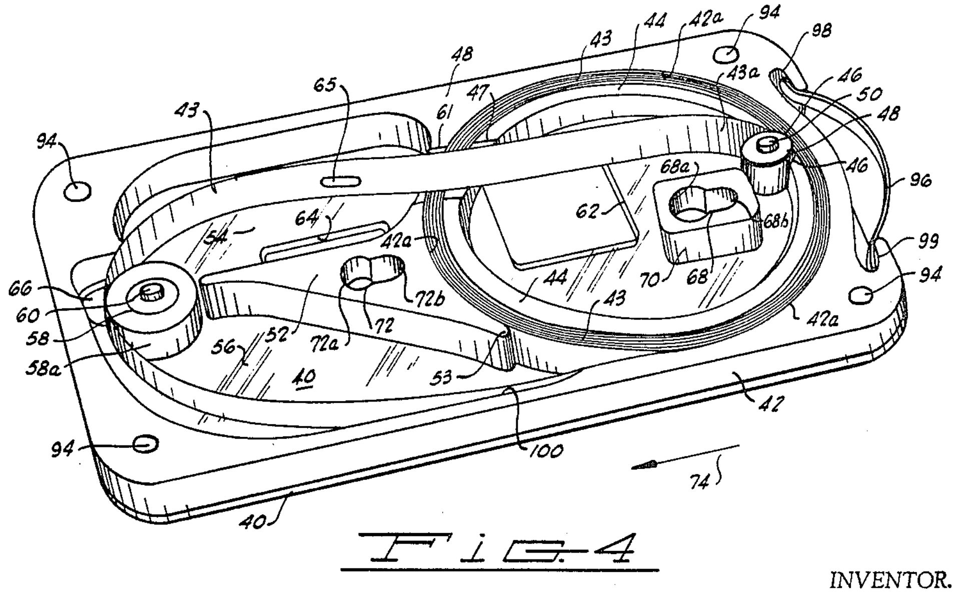
FIGURE 4 is that part of the replaceable magnetic tape cartridge which is not shown in FIG. 3.

A tape coiling guide 44 is connected adjacent one end of the plate 40, as best shown in FIG. 4. The tape coiling guide 44 is also fabricated from transparent plastic and is comprised of an annular wall having the same height as the peripheral side wall 42. The coiling guide 44 is disposed generally at right angles to the plate 40 so that the endless tape 43 will be coiled in a plane parallel to the plate 40, as illustrated. The tape coiling guide 44 has an opening or vertical slot 46 in one side thereof in which an idler wheel 48 may be journaled on an axle 50 which extends between the plates 40 and 41 and reduces friction as the tape 43 passes through the slot 46 as hereafter described. The tape coiling guide 44 has an open center portion, as is evident from both FIGS. 1 and 4, and is fixed or stationary within the cartridge. The coiling guide 44 also has a reduced height opposite the slot 46 to provide a horizontal slot 47 for passing the tape between the guide and the plate 41. The peripheral side wall 42 has an internal configuration **42*a* which closely approximates the contour of the guide means 44, but is spaced therefrom. This arrangement provides an annular chamber, defined by the tape coiling guide 44, the peripheral side walls 42 and the plates 40 and 41, which receives the coiled portion of the endless tape 43. The side wall 42 may conveniently be fabricated so as to include a center partition 52 which continues the circular curvature 42*a* around to the point 53 and provides a partition which tends to prevent fouling of the endless tape. The partition 52 has a reduced height to form a slot 61 corresponding to the slot 47 to pass the tape 43 between the partition 52 and the plate 41.**

An idler wheel 58 is journaled on an axle 60 (see FIG. 4) which extends between the two plates 40 and 41. The idler wheel 58 preferably has a resilient rim **58*a* formed of some relatively soft rubber material to promote frictional engagement between the lubricated tape 43 and the drive capstan 26, as hereafter described. The innermost coil of the lubricated endless tape 43 coiled about the tape coiling guide 44 passes through the vertical slot 46, over the opposite side of the guide 44 through horizontal slots 47 and 61 and around the idler wheel 58, then returns to the outside of the coiled tape around the guide means 44.**

The plate 40 is provided with an aperture to receive each of the parts projecting from the face 16 of the circuit housing 12. An aperture 62 receives the pickup head 22 which projects into the open center portion of the tape coiling guide 44 to engage the tape 43. An aperture 64 (see FIG. 4) receives the switch mechanism 24, which is either received in a slot 65 in the endless tape 43 and then extends into a slot 82 in the plate 41, or is depressed by the tape 43 to close the contacts **24*a* and 24*b*, as hereafter described in detail. Aperture 66 receives the drive capstan 26 which frictionally engages the endless tape 43 passing around the idler wheel 58.**

An elongated fastener slot 68 extends through an island-like portion 70 which is connected to the plate 40 in the open center portion of the tape coiling guide 44. A similar elongated fastener slot 72 extends through the interior partition 52. These fastener slots have large portions **68*a* and 72*a*, respectively, of a size sufficient to receive the heads 32*b* and 34*b*, respectively, of the fastener stud means. The slots have small portions 68*b* and 72*b*, respectively, of a smaller size which will not pass the head portions 32*b* and 34*b*, respectively, but will receive the shank portions 32*a* and 34*a*, respectively, when the cartridge is moved in the direction of arrow 74** (see FIGS. 1 and 4), as hereafter described in detail.

Figures 3, 5:
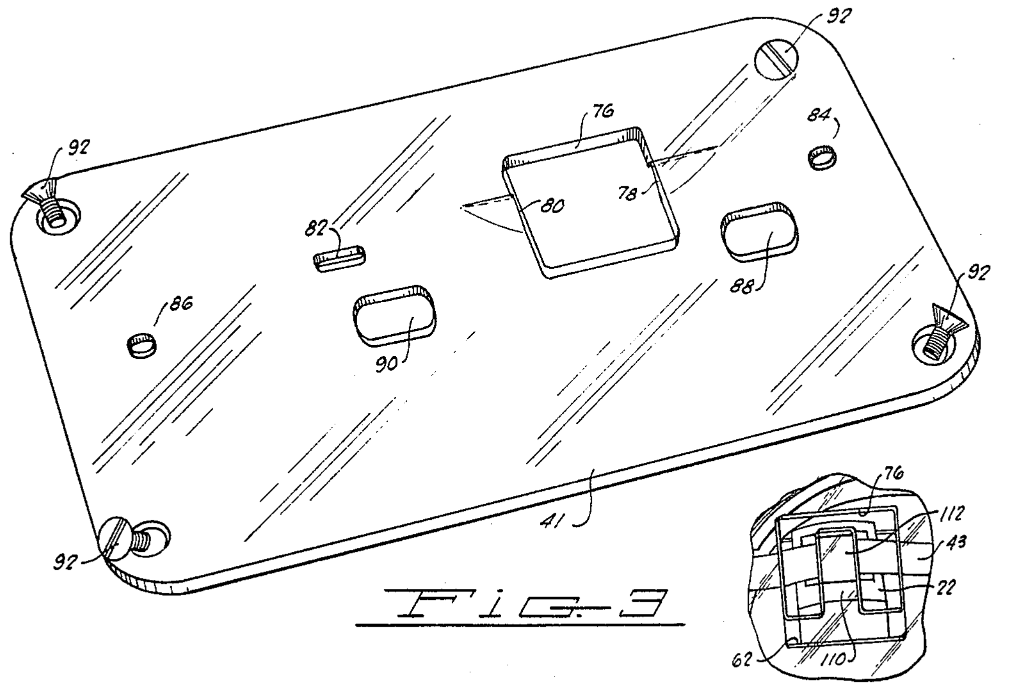
FIGURE 3 is a perspective view of one part of the replaceable endless magnetic tape cartridge of the device shown in FIG. 1.
FIGURE 5 is a perspective view of an optional feature which may be incorporated in the device of FIG. 1.

The plate 41 has an aperture 76 which corresponds in size and placement to the aperture 62 in the plate 40. The pickup head 22 preferably projects partway into the aperture 76 so that the edges of the plate 41 around the aperture 76 will press the tape against the head 22 when the tape is tensioned during operation. The thickness of the plate 41 may be reduced to form grooves 78 and 80 (see FIG. 3) for guiding the endless tape 43 as it passes over the pickup head 22. An aperture 82 is provided to receive the portion of the spring conductor 24c which is covered by the sleeve 28 and which will pass through the slot 65 in the tape 43 to open the switch 24. The apertures 84 and 86 journal the ends of the axles 50 and 60, respectively, the axes 50 and 60 being sufficiently large and tapered at the end so as not to pass completely through the apertures 84 and 86. The oval-shaped apertures 88 and 90 register with the fastener slots 68 and 72 and are of sufficient size to receive the head portions 32b and 34b, respectively, of the fastener stud means at either end thereof. The plate 41 may be connected to the peripheral side wall 42 by suitable screw fasteners 92 which are received in the threaded taps 94 (see FIG. 4).

A spring biasing means is also provided between the cartridge 14 and the circuit housing 12 for urging the cartridge in the direction of arrow 74 to lock the fastener means and press the endless tape 43 passing around the idler wheel 58 against the drive capstan 26. The spring biasing means preferably comprises a bowed leaf-type spring 96. The ends of the spring 96 are retained in recesses 98 and 99 in the peripheral side wall 42, which may have a curvature between the recesses to accommodate the spring 96 when fully compressed. The width of the spring means 96 is approximately equal to, but slightly less than, the height of the peripheral side walls 42 in order to work freely in the recesses and is retained in place in the recesses 98 and 99 by the two plates 40 and 41.

As previously mentioned, the endless tape cartridge 14 is assembled by gluing or otherwise bonding the peripheral side wall 42, including the partition wall portion 52, the tape coiling guide 44, and the island portion 72, to the plate 40. Of course, it is to be understood that, while these parts may be fabricated from separate pieces of plastic which are then bonded together, this entire structure can be simply and very economically molded as a single piece of plastic by injection molding, for example, complete with all apertures, grooves, etc. The idler wheels 48 and 58 may then be easily set in place by placing the axles 50 and 60, respectively, in the journal apertures (not shown) in the plate 40 which correspond to journal apertures 84 and 86 in plate 41.

The endless tape 43 is then coiled around the tape coiling guide 44 within the annular chamber formed between the coiling guide 44 and the curved inner wall 42a of the peripheral side wall 42. The innermost coil 43a of the tape 43 is passed through the aperture 46 and around the idler wheel 48 into the open center portion of the annular coiling guide 44. The tape 43 is twisted 90° and continues across the aperture 62, and across the pickup head 22 (when it is inserted through the aperture 62) and then across the side of the coiling guide 44 through the horizontal slots 47 and 61 which are opposite to the slot 46. The tape 43 passes the switch means 24 and is then twisted back 90° to pass around the idler wheel 58. The tape 43 is then returned through the opening between the point 53 and the point 100 of the peripheral side wall 42 as the outermost coil around the tape coiling guide 44.

The leaf spring 96 may be inserted in the two recesses 98 and 99 in the end of the side wall 42. The plate 41 can then easily be placed on the peripheral side wall 42 and the screws 92 threaded into the taps 94 with the journal apertures 84 and 86 receiving the ends of the axles 50 and 60, respectively. The spring means 96, the idler wheels 50 and 60, and the endless tape 43 are then all held in operative position within the cartridge. The plate 41 can be removed as desired to replace the tape 43 when it becomes worn or otherwise repair the cartridge.

The cartridge 14 may be placed in locked operative position on the circuit housing face 16 simply by pressing the spring 96 against the end plate 20 until the fastener studs 32 and 34 align with the large ends 68a and 72a, respectively, of the elongated fastener slots so that the enlarged head portions 32b and 34b, respectively, will pass through the slots. Then the cartridge is dropped against the face 16 and the enlarged head portions 32b and 34b will pass upwardly into the apertures 88 and 90 of the upper plate 41. When the cartridge is released, the spring 96 urges the cartridge away from the plate 20 in the direction of arrow 74 so that the shawk portions 32a and 34a, respectively, slide into the reduced-size portions 68b and 72b of the slots, respectively, with the head portions 32b and 34b still in the constant-sized apertures 88 and 90. The enlarged head portions 32b and 34b will not pass through the reduced-size portions 68b and 72b so that the cartridge is securely fastened or locked to the plate 16. At the same time, the pickup head means 22 is passed through the aperture 62 in the plate 40 and engages the tape 43 as it passes through the open center portion of the tape coiling guide 44. Similarly, the switch means 24 passes through the aperture 64 and engages the tape 43 in the chamber 54. The drive capstan 26 passes through the aperture 66 in the plate 40. The spring means 96 urges the cartridge 14 so that the resilient-rimmed idler wheel 58, and therefore the tape 43 which passes around the idler wheel 58, are pressed into engagement with the silicone rubber sleeve of the drive capstan 26, and the spring continues to urge the cartridge so as to insure positive frictional engagement between the drive capstan and the tape. The one simple motion of placing the cartridge over the fastener studs 32 and 34 is sufficient to both securely lock the cartridge in place on the circuit housing face 16 and to operatively engage the capstan against the tape 43.

It is highly desirable to employ self-lubricated tape because it will be evident that the innermost coil of the tape 43 must slide around the stationary tape coiling guide 44. Similarly, each coil of the tape must slide to a small extent on the next innermost coil because of the slight difference in the circumference of adjacent coils of the tape. The combination of the resilient rim on the idler wheel 58 and the silicone rubber on the idler wheel 58 provides improved friction between the very small diameter capstan and the lubricated tape 43 because the resilient idler wheel 58 presses the tape around a greater portion of the circumference of the high friction silicon rubber. This eliminates the need for a larger drive capstan and the corresponding complicated reduction gear train, even through a lubricated tape 43 is used.

It is usually desirable to make the recording device battery powered and therefore completely portable so that the device may be located close to any particular article to be described and sold. Also, the entire device shown in FIG. 1 may be placed within another housing to provide a more attractive appearance. The start button, which is not illustrated but was previously described, may be provided on the exterior of this housing together with appropriate instructions for starting the device. When the start button is pressed, the sound reproducing circuitry will be energized and the motor of the drive capstan 26 started. Assume that the sleeve 28 of the switch 24 is received in the groove 65 of the tape and passes into the slot 82 of the plate 41 so that the spring conductor 24c opens the contacts 24a and 24b. When the start button is manually pressed, the circuit will be momentarily completed to start the motor which drives the drive capstan 26. The slot 65 in the tape 43 will be quickly moved and the tape 43 will wedge between the sleeve 28 and the plate 41 to force the sleeve 28 out of the slot 82 and close the contacts 24a and 24b. Operation of the device will then continue so long as the tape covers the slot 82. The message recorded on the tape 43 is then reproduced as the drive capstan 26 continues to operate until the entire message has played and the slot 65 in the tape 43 again passes the sleeve 28 which instantly springs through the slot 65 into the slot 82 and opens the stop switch 24 to stop operation of the device. The device will not play the message again until the manual start button is once again pressed.

If desired, a finger 110 may be formed in the aperture 76 to insure that the endless tape 43 is continually held against the pickup head 22 as the tape is passed through the open center portion of the coiling guide 44. As will be evident, the finger 110 may be molded as a part of the upper plate 41. Because of the resiliency of the plastic material from which the plate 41 may be fabricated, a relatively uniform pressure will be exerted to urge the tape into contact with the pickup head 22 even though minor variances may exist in the position of the cartridge, and therefore of the finger 110, with respect to the pickup head due either to the alignment of the cartridge or to the dimensions of the cartridge and pickup head. As previously mentioned, the endless tape 43 is preferably fabricated from the self-lubricated plastic material for reducing friction between adjacent contacting coils of the tape. Therefore, a short strip 112 of the tape may conveniently be cemented or otherwise fixed to the lower side of the finger 110 which presses against the tape 43 to reduce the friction between the finger 110 and the tape 43.

It will be evident that an endless magnetic tape device has been described having a novel, compact arrangement of operative parts which permits the entire device to be contained within a very small housing. The novel replaceable cartridge has a novel endless tape coiling guide 44 which is sufficiently large to eliminate the need for a number of expensive rollers, or the more conventional revolving spool used to store endless tapes. The novel tape coiling guide permits the pickup head to be introduced into the open center portion and thereby greatly reduce the space occupied by the cartridge. The tape is twisted 90° as it passes the side of the guide means opposite the slot 46 so that the total thickness of the cartridge 14 is only slightly greater than the width of the endless tape 43. The novel combination of the silicone rubber friction sleeve **26*a* on the drive capstan 26 and the resilient rim 58*a* on the idler wheel 58 provides sufficient friction that a reducing gear train is not required in order to provide two large contacting surfaces to frictionally grip the lubricated endless tape 43, even though the force of the biasing spring 96** is small. The novel drive combination also permits the use of a smaller drive motor. The replaceable cartridge is very easily inserted in operative position because of the novel fastener means and the novel spring biasing means. Acting in concert, the fastener means and spring biasing means both lock the cartridge in operative position and continually maintain a pressure between the tape and the drive capstan to insure a positive and uniform drive which is absolutely essential to good sound reproduction.

A message, along with any desired background effects, can be recorded on any number of the cartridges in a properly equipped sound room by a person having a good speaking voice. Then the cartridges can be easily transported to playback machines located at any number of stores throughout the country. The battery-powered, portable playback machine can be positioned at any point in a store in close proximity to the particular article being sold. The cartridge can be placed in operative position on the playback machine by the most inexperienced personnel without danger of fouling the enclosed tape.

The clear plastic construction permits continued visual monitoring of the tape and its operation. Both the cartridge and the playback device can be manufactured at a very low cost. The cartridges, in particular, may be manufactured by molding only two pieces of plastic, inserting the idler wheels, the spring and the tape, and then assembling the plastic parts.

Having thus described a particular embodiment of my invention, it is to be understood that various changes and substitutions can be made in the particular embodiment herein described in detail and illustrated without departing from the spirit and scope of my invention as defined by the appended claims.

I claim:

1. In an endless magnetic tape device, the combination of:
   - a fixed, annular tape coiling guide forming a circular channel and having an open center portion and an opening in one side thereof for passing an endless tape coiled around the guide into the open center portion said circular channel being defined by an annular inner member and a concentric, substantially annular outer member extending substantially more than 180° around the periphery of said annular inner member whereby when a tape is coiled in said circular channel, it is confined and guided over a major portion of the circular channel by said inner and outer members;
   - drive means for pulling the innermost coil of an endless tape coiled around the guide through the opening and diametrically across the open center portion and across the opposite side of the guide and returning the tape as the outermost coil about the coiling guide; and
   - a pickup head disposed in the open center portion for operative engagement with a tape as it is pulled through the open center portion by the drive means.

2. A magnetic tape device comprising, in combination:
   - a circuit housing having a generally flat face;
   - a replaceable tape cartridge having a first wall abutting the flat face;
   - a coiling guide forming a circular channel and having an open center portion and a slot in one side thereof disposed within the cartridge for coiling an endless tape in a plane parallel to the first wall;
   - a first aperture in the first wall adjacent the open center portion;
   - a pickup head projecting from the first generally flat face and extending through the aperture into the open center portion of the coiling guide;
   - an idler wheel journaled in the cartridge in alignment with the slot and the first aperture, with the first aperture located in the middle;
   - an endless tape coiled around the coiling guide with the inner coil thereof passing through the slot, across the pickup head, being twisted 90° relative to the slot and crossing the side of the coiling guide opposite the slot then being twisted through 90° to return the tape to its original attitude, passing around the idler wheel, and returning as the outermost coil around the coiling guide;
   - a second aperture in the first wall; and
   - a drive capstan projecting from the first generally flat face through the second aperture into frictional engagement with the portion of the tape passing around the idler wheel;
   - whereby upon rotation of the drive capstan, the innermost coil of the endless tape will be pulled through the slot and across the pickup head to produce sound and the tape will be returned as the outermost coil of the tape around the coiling guide.

3. A magnetic tape device comprising the combination as set out in claim 2 further characterized by fastener means for releasably holding the cartridge in properly aligned abutting position against the face of the circuit housing with the endless tape passing around the idler wheel urged against the drive capstan.

4. A magnetic tape device as defined in claim 3 wherein the fastener means for releasably holding the cartridge in properly aligned, abutting position against the face of the playback housing comprises:

fastener stud means on one of the housing and cartridge and slot means for receiving the stud means on the other of the housing and cartridge, the stud means being locked upon a movement of the cartridge in a direction to urge the tape passing around the idler wheel against the drive capstan, and spring means for urging the cartridge in said direction to lock the fastening means and urge the tape against the drive capstan.

5. A magnetic tape playback device as defined in claim 4 wherein the stud means is connected to the playback housing and projects from the first generally flat face thereof, the stud means having a shank portion and an enlarged end portion, and the slot means is an elongated slot in the cartridge extending along said direction of movement for locking the fastening means, the slot being sufficiently large at the end thereof adjacent the idler wheel to receive the enlarged end portion and smaller at the other end to receive the shank portion and not the enlarged end portion.

6. A magnetic tape playback device as defined in claim 5 wherein the playback housing is further characterized by a plate disposed normal to the first generally flat face and at the edge thereof, and the spring means comprises a bowed leaf spring connected to the cartridge.

7. A magnetic tape device comprising the combination as set out in claim 2 wherein the idler wheel is provided with a resilient rim, the drive capstan is provided with a relatively small diameter, high friction rim, and the endless magnetic tape is fabricated from a self-lubricating material having a low coefficient of friction.

8. A replaceable endless tape cartridge for a tape recorder-playback device having a pickup head and a drive capstan spaced apart and projecting from one face of the device, the tape cartridge comprising:

a housing having a generally flat wall;

a coiling guide forming a circular channel and disposed within the housing for cousing an endless tape to coil in a plane parallel to the flat wall, the coiling guide having an open center portion and a slot in one side thereof;

an idler wheel journaled in the housing substantially in line with the slot and the open center portion of the coiling guide with the open center portion between the slot and the idler wheel;

an endless tape coiled around the guide means with the inner coil thereof passing through the slot, through the open center portion, being twisted 90° as it passes the opposite side of the coiling guide means, being twisted back 90° and passing around the idler wheel, and returning as the outermost coil around the coiling guide means;

a first aperture in the flat wall of the housing adjacent the open center portion for passing the pickup head into the open center portion and into operative engagement with the tape; and a second aperture in the flat wall of the housing adjacent the idler wheel for receiving the drive capstan into engagement with the tape passing around the idler wheel.

9. A replaceable endless tape cartridge as defined in claim 8 wherein, the housing comprises two parallel plates spaced apart a distance slightly greater than the width of the endless tape and peripheral side walls extending between the plates around the sides thereof, and the circular coiling guide means comprises a cylindrical sleeve the walls of which are disposed generally normal to the plates.

10. A replaceable endless tape cartridge as defined in claim 9 wherein the peripheral walls and one of the plates are molded as a single piece of plastic, and the other plate is fastened to the peripheral side walls to form the cartridge housing.

11. A replaceable endless tape cartridge as defined in claim 8 wherein the parts fabricated of plastic are fabricated of substantially transparent plastic.

12. In an endless tape device having a drive capstan projecting from a face of a circuit housing member and a replaceable endless tape cartridge member having an idler wheel therein about which an endless tape is passed, the combination of:

fastener means comprising at least one stud projecting from one of the members having a shank and an enlarged head at the end thereof and a slot on the other member for receiving the stud, the slot having a larger end nearest the idler wheel sufficiently large to receive the enlarged head and a smaller end remote from the housing sufficiently large to receive only the shank, and spring means disposed between the two members for urging the cartridge in a direction to force the shank from the larger end of the slot to the smaller end and the idler wheel and tape passing therearound into engagement with the drive capstan.

References Cited by the Examiner

FOREIGN PATENTS

| | | |
|---|---|---|
| 532,989 | 9/1955 | Italy. |
| 971,401 | 1/1959 | Germany. |

OTHER REFERENCES

RCA Technical Notes, No. 202, January 5, 1959, 179–100.2.

BERNARD KONICK, *Primary Examiner.*

R. GOUDEAU, J. MOFFITT, *Assistant Examiner.*